United States Patent
Saka et al.

(10) Patent No.: US 8,230,494 B2
(45) Date of Patent: Jul. 24, 2012

(54) IMAGE PROCESSING APPARATUS, IMAGE PROCESSING METHOD AND RECORDING MEDIUM

(75) Inventors: Masaaki Saka, Toyohashi (JP);
Kazuhiro Ishiguro, Toyohashi (JP);
Hiroyuki Suzuki, Toyokawa (JP);
Hideyuki Toriyama, Toyokawa (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1217 days.

(21) Appl. No.: 11/976,206

(22) Filed: Oct. 22, 2007

(65) Prior Publication Data
US 2008/0104707 A1 May 1, 2008

(30) Foreign Application Priority Data
Oct. 31, 2006 (JP) .................................. 2006-297127

(51) Int. Cl.
*G06F 21/00* (2006.01)
(52) U.S. Cl. ............................................ 726/16; 726/26
(58) Field of Classification Search .................. None
See application file for complete search history.

(56) References Cited

U.S. PATENT DOCUMENTS

| | | | | |
|---|---|---|---|---|
| 6,954,532 | B1* | 10/2005 | Handley et al. | 380/54 |
| 7,264,411 | B2* | 9/2007 | Matsunaga et al. | 400/62 |
| 2002/0015175 | A1* | 2/2002 | Katsuda | 358/1.15 |
| 2002/0021453 | A1* | 2/2002 | Sakamoto et al. | 358/1.14 |
| 2004/0184065 | A1 | 9/2004 | Guan et al. | |
| 2005/0206916 | A1* | 9/2005 | Nakagiri et al. | 358/1.2 |
| 2005/0259288 | A1* | 11/2005 | Minato | 358/1.13 |
| 2005/0265744 | A1* | 12/2005 | Uruta | 399/80 |
| 2006/0017960 | A1* | 1/2006 | Kakigi | 358/1.14 |
| 2006/0098236 | A1* | 5/2006 | Yamashita et al. | 358/302 |
| 2006/0136992 | A1* | 6/2006 | Shigeeda | 726/2 |
| 2006/0209349 | A1 | 9/2006 | Tabata | |

(Continued)

FOREIGN PATENT DOCUMENTS

JP 11-46297 2/1999
(Continued)

OTHER PUBLICATIONS

Notification of Reasons for Refusal issued in corresponding Japanese Patent Application No. 2006-297127, mailed Mar. 25, 2008, and English translation.

*Primary Examiner* — Gilberto Barron, Jr.
*Assistant Examiner* — David Le
(74) *Attorney, Agent, or Firm* — Buchanan Ingersoll & Rooney PC

(57) ABSTRACT

An image processing apparatus, comprises: a document reader that reads images printed in a plurality of areas in a document; a printer that prints on a sheet image data read out from the document by said document reader; a security code detector that detects a security code given to each of the plurality of areas in said document; a password detector that detects a password given at least to one of the plurality of areas in said document; an entry requestor that requests a password to be entered; a password judgment part that judges whether or not said entered password is an appropriate one that corresponds to the password detected by the password detector; and a controller that decides an operation performed by said printer, to print image data from the area having the given password, depending on the judgment result drew by said password judgment part.

20 Claims, 12 Drawing Sheets

U.S. PATENT DOCUMENTS

2007/0045427 A1    3/2007  Onishi
2007/0058803 A1*   3/2007  Suga ............................. 380/30

FOREIGN PATENT DOCUMENTS

| JP | 2001-057631   | 2/2001  |
| JP | 2003-32488 A  | 1/2003  |
| JP | 2003-091526   | 3/2003  |
| JP | 2003-316552 A | 11/2003 |
| JP | 2004-032033   | 1/2004  |
| JP | 2004-201069 A | 7/2004  |
| JP | 2005-148393   | 6/2005  |
| JP | 2005-148393 A | 6/2005  |
| JP | 2005-151149 A | 6/2005  |
| JP | 2006-262481   | 9/2006  |
| JP | 2007-060242   | 3/2007  |
| JP | 2007-325022   | 12/2007 |
| JP | 2008-028449   | 2/2008  |

* cited by examiner

IMAGE PROCESSING APPARATUS, IMAGE PROCESSING METHOD AND RECORDING MEDIUM

This application claims priority under 35 U.S.C. §119 to Japanese Patent Application No. 2006-297127 filed on Oct. 31, 2006, the entire disclosure of which is incorporated herein by reference in its entirety.

BACKGROUND OF THE INVENTION

1. Field of the Invention

The present invention relates to an image forming apparatus applied to MFPs (Multi Function Peripherals) that is a digital multifunctional complex machine capable of detecting a security code and a password given to a document or creating a document having a security code and a password given thereto, an image processing method, and a recording medium having an image processing program recorded therein to make a computer in the image processing apparatus execute image processing.

2. Description of the Related Art

The following description sets forth the inventor's knowledge of related art and problems therein and should not be construed as an admission of knowledge in the prior art.

In recent years, paper document security has been enhanced so as to prevent, for example, paper copied from a confidential document by a copy machine or other from being leaked to outsiders, and paper copied from an original document from being misused as the original document itself.

For example, according to an art disclosed in Japanese Laid-open Patent Publication No. 2004-201069, image data is prohibited/permitted by a ground pattern to be outputted, and the prohibited image data is released by an entered password.

Further, according to an art disclosed in Japanese Laid-open Patent Publication No. 2003-316552, a password is given to a confidential document.

However, the arts described right above leaves the following disadvantage since only one password is given to one sheet to be outputted.

In other words, when images from a document are printed in a plurality of areas on a sheet by the N in 1 mode to print images of N pages of document on one sheet, only one password is given to the whole one sheet no matter if the document includes confidential information such as copyrightable expressions or images, secrets and personal information, as well as nonconfidential information. Thus, the arts still lack in flexibility and usability of document security management The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing apparatus capable of ensuring security of an image printed in each of a plurality of areas on a sheet of document.

It is another object of the present invention to provide an image processing method capable of ensuring security of an image printed in each of a plurality of areas on a sheet of document.

It is yet another object of the present invention to provide a recording medium having an image processing program recorded therein to make a computer in the image processing apparatus execute image processing.

According to a first aspect of the present invention, an image processing apparatus comprises:

a document reader that reads images printed in a plurality of areas in a document;

a printer that prints on a sheet image data read out from the document by said document reader;

a security code detector that detects a security code given to each of the plurality of areas in said document;

a password detector that detects a password given at least to one of the plurality of areas in said document;

an entry requestor that requests a password to be entered;

a password judgment part that judges whether or not said entered password is an appropriate one that corresponds to the password detected by the password detector; and a controller that decides an operation performed by said printer, to print image data from the area having the given password, depending on the judgment result drew by said password judgment part.

According to a second aspect of the present invention, an image processing apparatus comprises:

a document reader that reads images of a document;

a printer that prints on a sheet image data read out from the document by said document reader;

a mode setter that enables the N in 1 mode to print images of N pages of a document on one sheet;

a security code giver that gives a security code by the security code giving mode to each of a plurality of areas on said sheet, in which the image data read out from the document is to be printed, if the N in 1 mode is enabled by said mode setter;

a display that displays the plurality of areas to be outputted on the sheet, if the N in 1 mode is enabled;

an area selector that selects at least one of the plurality of areas displayed on said display; and a password giver that gives a password to said selected area.

According to a third aspect of the present invention, an image processing method comprises:

reading images printed in a plurality of areas in a document;

printing on a sheet image data read out from said document;

detecting a security code given to each of the plurality of areas in said document;

detecting a password given at least to one of the plurality of areas in said document;

requesting a password to be entered;

judging whether or not said entered password is an appropriate one that corresponds to said detected password; and deciding an operation to print image data from the area having the given password, depending on said judgment result.

According to a fourth aspect of the present invention, an image processing method comprises:

reading images of a document;

enabling the N in 1 mode to print images of N pages of a document on one sheet;

giving a security code by the security code giving mode to each of a plurality of areas on a sheet, in which image data read out from the document is to be printed, if said N in 1 mode is enabled;

displaying the plurality of areas to be outputted on the sheet, if the N in 1 mode is enabled;

selecting at least one of said displayed plurality of areas; and giving a password to said selected area.

According to a fifth aspect of the present invention, a recording medium makes a computer in an image processing apparatus execute:

reading images printed in a plurality of areas in a document;

printing on a sheet image data read out from said document;

detecting a security code given to each of the plurality of areas in said document;

detecting a password given at least to one of the plurality of areas in said document;

requesting a password to be entered;

judging whether or not said entered password is an appropriate one that corresponds to said detected password; and deciding an operation to print image data from the area having the given password, depending on said judgment result.

According to a sixth aspect of the present invention, a recording medium makes a computer in an image processing apparatus execute:

reading images of a document;

enabling the N in 1 mode to print images of N pages of a document on one sheet;

giving a security code by the security code giving mode to each of a plurality of areas on a sheet, in which image data read out from the document is to be printed, if said N in 1 mode is enabled;

displaying the plurality of areas to be outputted on the sheet, if the N in 1 mode is enabled;

selecting at least one of said displayed plurality of areas; and giving a password to said selected area.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
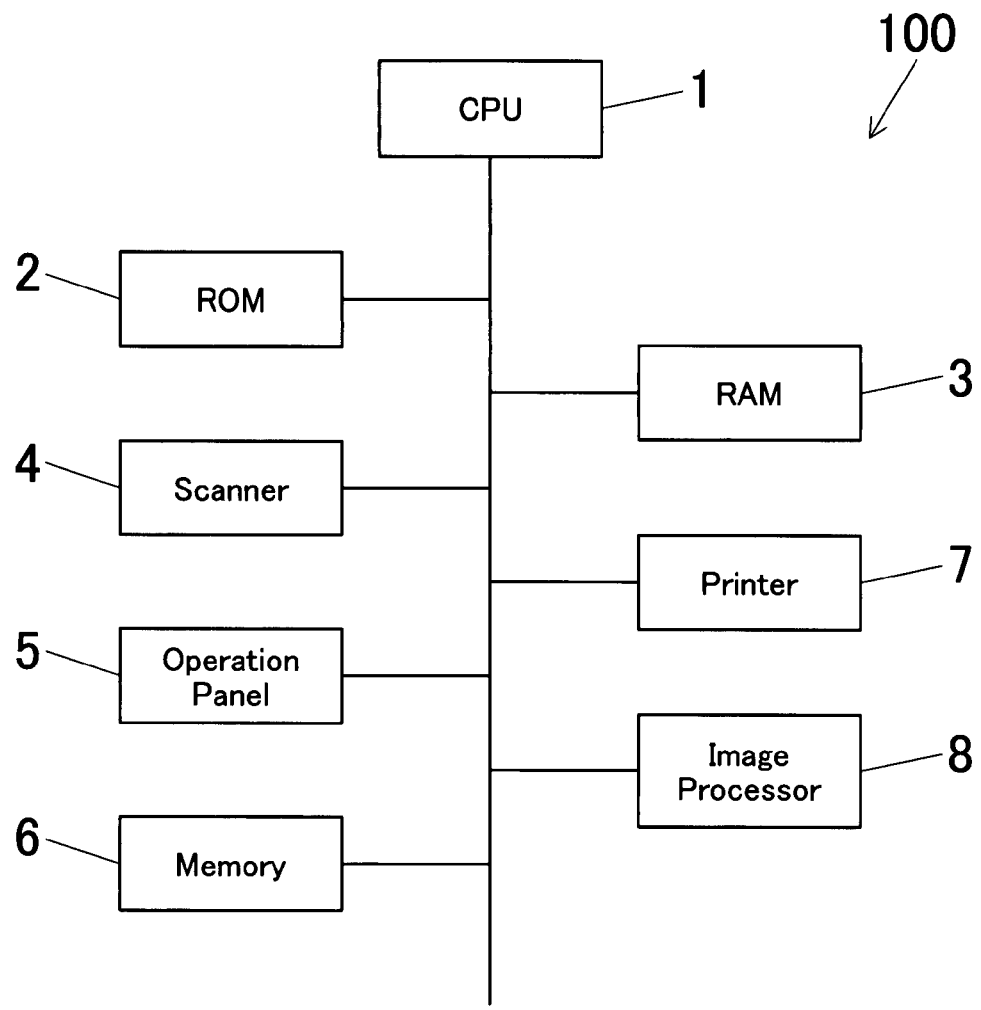
FIG. 1 is a block diagram showing an electrical configuration of a MFP to which an image processing apparatus according to one embodiment of the present invention is applied.

As shown in FIG. 1, a MFP 100 that is an image processing apparatus according to one embodiment of the present invention, comprises a CPU 1, a ROM 2, a RAM 3, a scanner 4, an operation panel 5, a memory 6, a printer 7 and an image processor 8.

The CPU 1 controls all operations performed in the MFP 100. Specifically, it controls following operations in this embodiment. If the security code giving mode is enabled and the N in 1 mode to print N pages of document on one sheet is enabled, image data read out from N pages of a document are printed in respective areas on a sheet, at the same time, a security code is given to each of the areas and a password is given at least to one of the areas. On the other hand, if the N in 1 mode is not enabled, image data read out from one page of the document is printed on one sheet, at the same time, one security code is given to the whole one sheet and, if needed, one password is also given thereto.

Further, if a password is detected out, the CPU 1 makes the operation panel 5 display a screen for password entry, and judges whether or not the entered password is appropriate, and then makes related parts to work accordingly depending on the judgment result.

In this embodiment, a ground pattern 40, which collectively corresponds to a security code and a password, is given behind image as a background. Alternatively, the security code and the password can be of another type such as a barcode and a wireless IC chip. Further, the security code and the password can be detected by an appropriate method depending on its type. Further, the security code and the password can be given separately.

The ROM 2 is a memory that stores a program that is executed by the CPU 1, and the RAM 3 is a memory that provides a working space for the CPU 1 to execute the operation program.

The scanner 4 reads images of a document that is set on a document table not shown in Figure or automatically transferred by an automatic document feeder neither shown in Figure, and then outputs image data read out from the document to the image processor 8.

Figure 5:
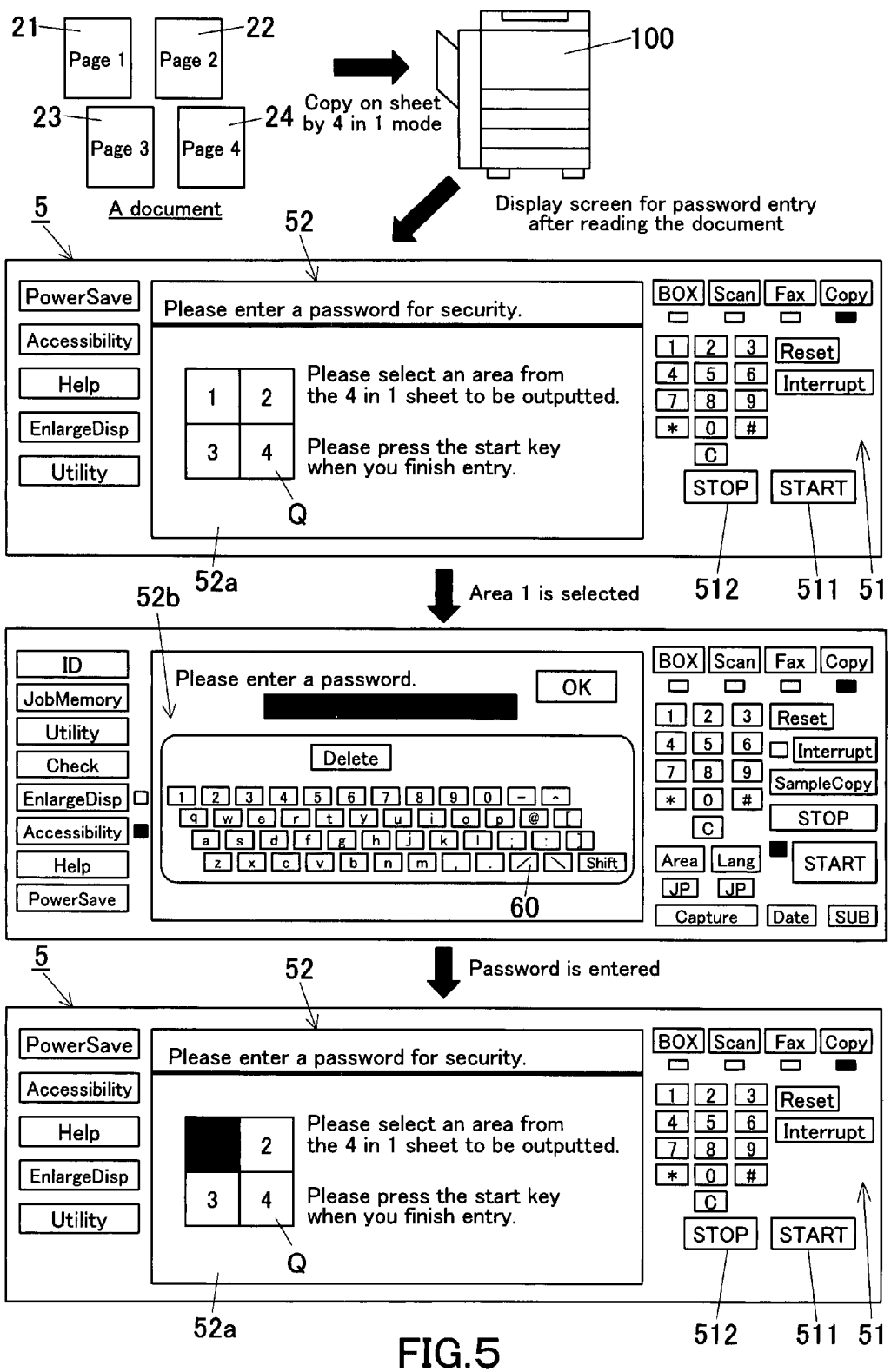
FIG. 5 is a view to explain an operation to enter a password from an operation panel when a document is copied by the N in 1 mode.
Figure 9:
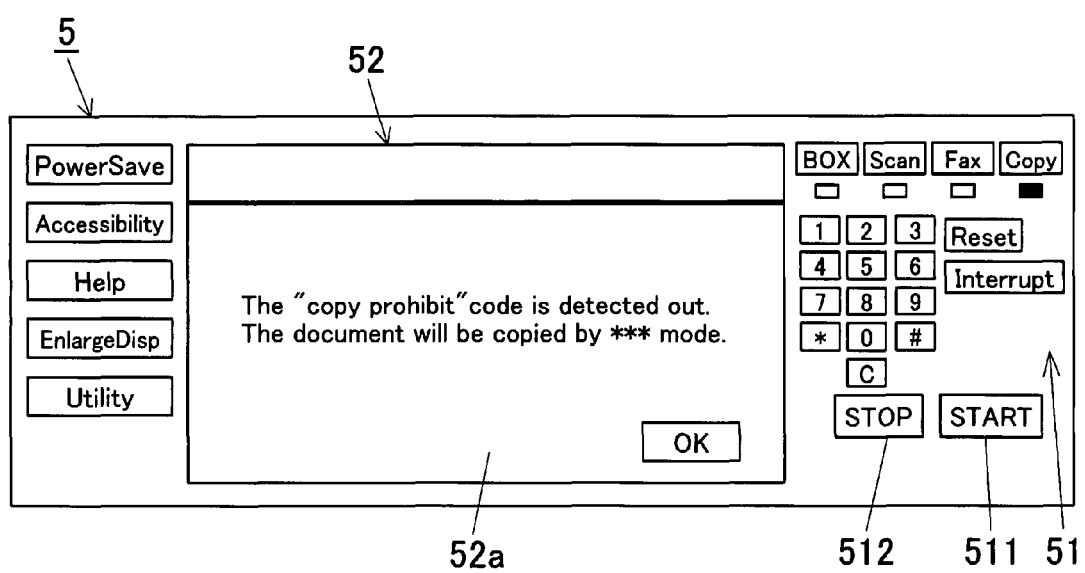
FIG. 9 is a plain view showing the operation panel with a display that displays a message if an entered password is inappropriate.

As shown in FIG. 5 and FIG. 9, the operation panel 5 comprises a key pad 51 for various entry operations, and a display 52 that is a LCD, etc. A touch panel can be embedded in the display 52. The key pad 51 has a start key 511 and a stop key 512.

In this embodiment, a user performs various operations using the operation panel 5. For example, he/she enables the N in 1 mode, enables/disables the mode to give a security code and a password (a ground pattern) to each area, enters a security code and a password for each area if the mode to give a security code and a password is enabled, and enables/disables the mode to detect a security code given to a document, enables the mode to perform an operation if the mode to detect a given security code is enabled and the detected security code is "copy prohibit", and enables the mode to perform an operation depending on whether or not the entered password is appropriate, etc. Then, the CPU 1 accepts the user setting and entry operations above and executes processing according thereto.

The memory 6 records various types of data and programs therein, and a hard disk, for example, is used as the memory 6.

The printer 7 prints image data read out by the scanner 4 then processed in a predetermined manner and the ground pattern 40 that collectively corresponds to a security code and a password, according to job conditions The image processor 8 processes the image data read out from a document by the scanner 4, in a predetermined manner. Detailed explanation regarding the process will be provided below.

Figure 2:
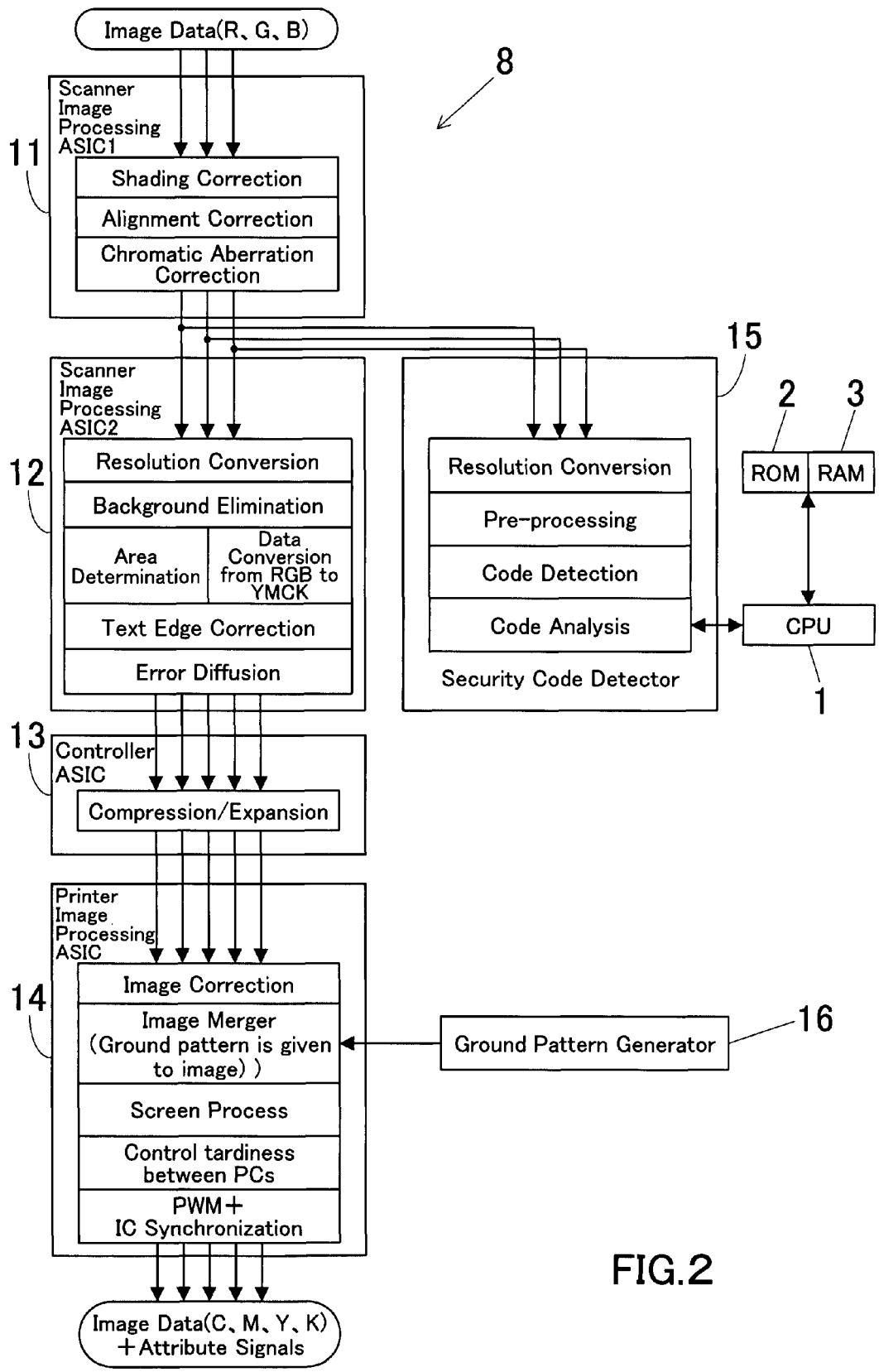
FIG. 2 is a block diagram showing a functional configuration of an image processor embedded in the image processing apparatus shown in FIG. 1.
Figure 3:
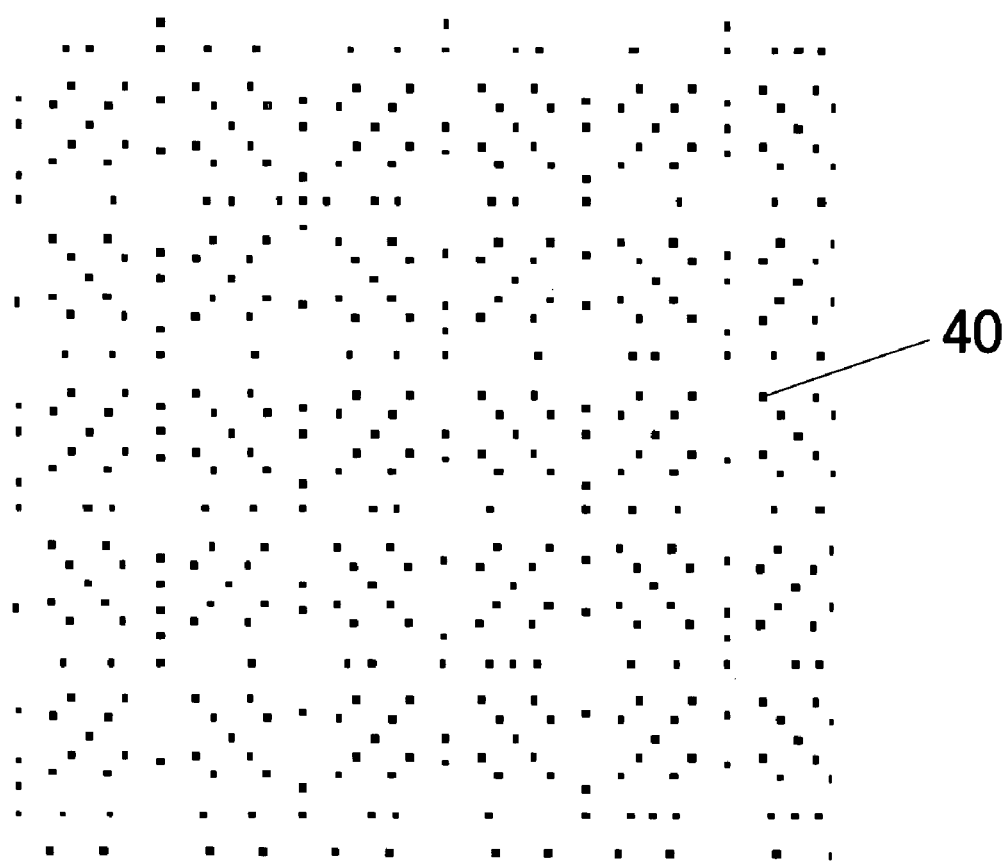
FIG. 3 shows one example of a ground pattern that corresponds to a security code and a password collectively.

As shown in FIG. 2, the image processor 8 comprises a first scanner image processor 11, a second scanner image processor 12, a controller 13, a printer image processor 14, a security code detector 15, a ground pattern generator 16, etc.

The first scanner image processor 11 performs shading correction, alignment correction, chromatic aberration correction, etc. on the image data (R, G, B) read out by the scanner 4.

The second scanner image processor 12 performs resolution conversion, background elimination, area determination, data conversion from R, G, B to Y, M, C, K, text edge correction, error diffusion, etc. on the image data received from the first scanner image processor 11.

The controller 13 compresses/expands the image data processed by the second scanner image processor 12.

The printer image processor 14 performs processes to prepare for printing on the image data received via the controller 13, and those are image correction, image merger, a screen process, etc. Then, the image data (R, G, B) is outputted to the printer 7 together with given attribute information.

Image merger performed by the printer image processor 14 corresponds to a process to merge the ground pattern 40, a security code and a password, to the image data read out from a document 20. In this way, the ground pattern 40 generated by the ground pattern generator 16 is given to the image data read out by the scanner 4, in other words, it is embedded as a background behind image.

Meanwhile, the image data processed by the first scanner image processor 11 is also transmitted to the security code detector 15. The security code detector 15 picks up the ground pattern 40 from the image data received via the first scanner image processor 11 so as to detect a security code as well as a password if it is given. Concretely, some known processes such as resolution conversion, pre-processing, code detection, code analysis, etc. are performed thereby under the control of the CPU 1.

Hereinafter, one embodiment will be explained with reference to FIG. 4, wherein the MFP 100 prints image data read out from a document having N pages (e.g. two pages) is printed in a plurality of areas on a sheet by the N in 1 mode (the 2 in 1 mode for example), and simultaneously gives a security code and a password to each of the areas as a ground pattern.

Figure 4:
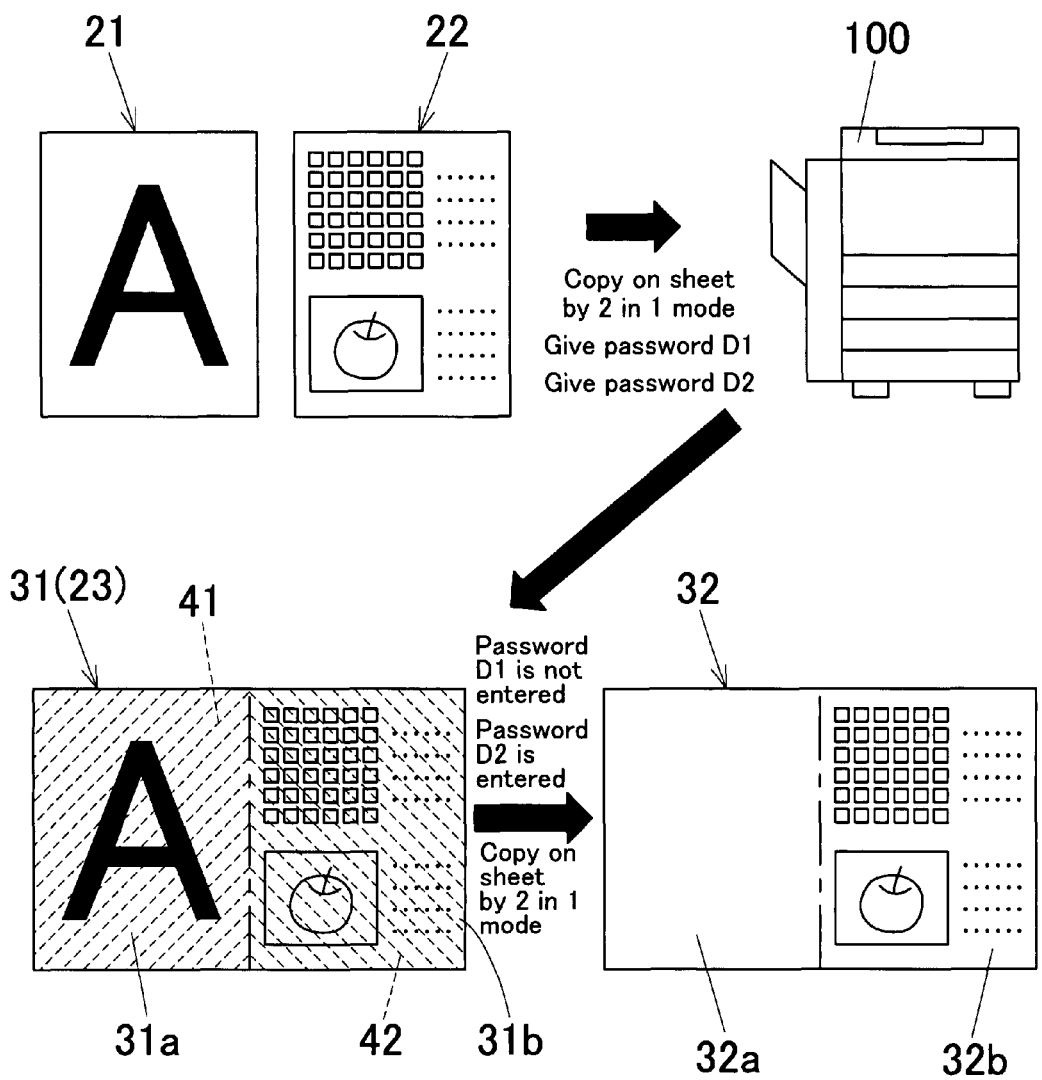
FIG. 4 is a view to explain an operation to give, when a document is copied on a sheet by the 2 in 1 mode, a security code and a password to each image on the sheet.

As shown in FIG. 4, when two pages, a document 21 and a document 22, are copied on a sheet 31 by the 2 in 1 mode, an image from the document 21 is printed in the left half of the sheet 31 (an area 31a) and an image from the document 22 is printed in the right half of the sheet 31 (an area 31b). If the security code giving mode and the password giving mode are enabled, two different sets of a security code and a password are given to the areas 31a and 31b, respectively, as a ground pattern 41 and a ground pattern 42.

Meanwhile, the ground pattern 41 indicates "copy prohibit" and a password D1, and the ground pattern 42 indicates "copy prohibit" and a password D2, for example. The security code to be given behind image as a ground pattern is not limited to "copy prohibit", but it can be other information such as "copy permit" or coordinates information of the image data. However, it should be "copy prohibit" if a password is given, since a password is used to release copy prohibit.

In this way, image data read out from the documents 21 and 22 are printed in the areas 31a and 31b on the sheet 31, respectively. In other words, a document 23 having a set of a security code and a password given in each of the areas 31a and 31b is obtained.

A method will be explained with reference to FIG. 5, wherein a password is entered from the operation panel 5 when a document is copied by the N in 1 mode.

As shown in FIG. 5, when four pages of a document, a document 21 through a document 24, are copied by the 4 in 1 mode, images of the respective documents are read, then a screen 52a (shown in the upper region of FIG. 5) to request for password entry is displayed on the display 52 of the operation panel 5.

Specifically, there are some messages displayed on the screen 52a together with four areas (areas Q) in which images of the documents are to be printed, and the messages are "please select an area from the 4 in 1 sheet to be outputted" and "please press the start key when you finish entry" for example.

Subsequently, a user selects a target area from the areas Q to give a password, and then a virtual keyboard 60 is displayed on the screen 52b (shown in the middle region of FIG. 5).

The user enters a password for the selected area using the virtual keyboard 60, the screen is returned to the screen 52a (shown in the lower region of FIG. 5) to request for password entry.

Then, the selected area is marked in black as shown in the screen 52a. In this way, a password is successfully entered.

Subsequently, a procedure will be explained with reference to the flowchart in FIG. 6, wherein a security code and a password are given to each area on a sheet, in which image data read out from a document is to be printed, when the image data is printed by the N in 1 mode. The processes are executed by the CPU 1 according to an operation program recorded in a recording medium such as the ROM 2. In this embodiment, a document is transferred by an automatic document feeder.

Figure 6:
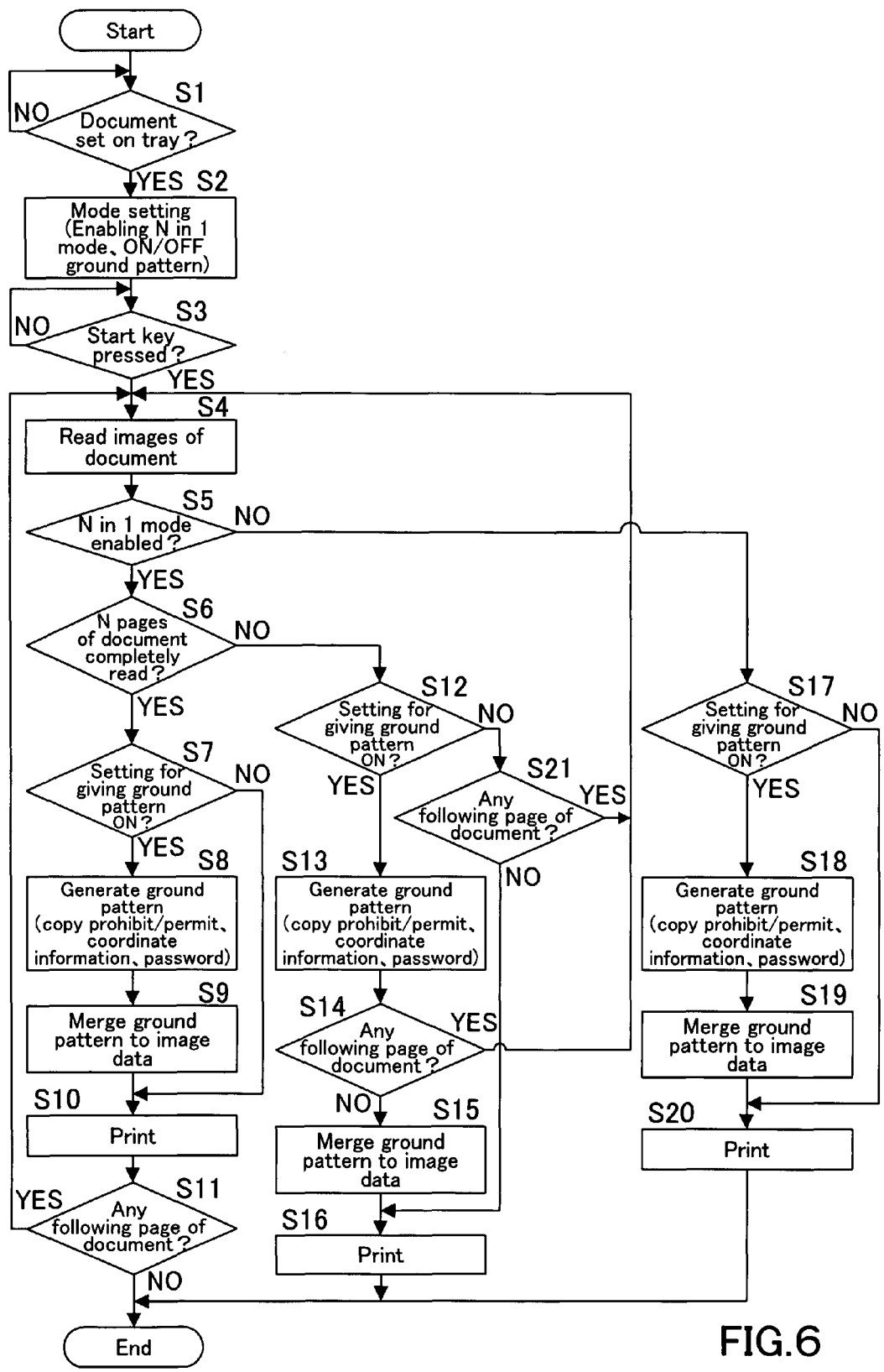
FIG. 6 is a flowchart showing a procedure to give, when a document is copied on a sheet by the N in 1 mode, a security code and a password to each image on the sheet.

As shown in FIG. 6, the routine waits in Step S1 until a document is set on a tray of an automatic document feeder of the scanner 4. If a document is set (YES in Step S1), mode setting is performed according to user operation in Step S2. The mode setting includes enabling the N in 1 mode, enabling/disabling (ON/OFF) the mode to give a ground pattern (a security code and a password), setting information to be embedded in the ground pattern if it is given, etc. as previously mentioned.

Subsequently, the routine waits until a start key 511 is pressed in Step S3. If the start key 511 is pressed (YES in Step S3), a document P is started to be read in Step S4. If one page of the document is completely read, it is judged in Step S5 whether or not the N in 1 mode is enabled.

If the N in 1 mode is enabled (YES in Step S5), it is judged in Step S6 whether or not N pages of the document are completely read. If N pages of the document are not yet completely read (NO in Step S6), the routine proceeds to Step S12 where it is judged whether or not the setting for giving a ground pattern is configured, in other words, the security code giving mode and the password giving mode are enabled. If the setting for giving a ground pattern is not configured (NO in Step S12), it is judged in Step S21 whether or not there is any following page of the document. If there is any following page of the document (YES in Step S21), the routine returns to Step S4. If there is no following page of the document (NO in Step S21), less than N pieces of image data read out from the document are printed on one sheet in Step S16, then the routine terminates.

If the setting for giving a ground pattern is configured (YES in Step S12), a ground pattern having a security code and a password embedded therein is generated in Step S13. The security code to be embedded in a ground pattern can be "copy prohibit", "copy permit", coordinates information, etc. as previously mentioned. In Step S14, it is judged whether or not there is any following page of the document, and if there is any following page of the document (YES in Step S14), then the routine returns to Step S4.

If there is no following page of the document (NO in Step S14), ground patterns generated according to the predetermined information are given and merged to the respective less than N pieces of image data in Step S15, and the merged image data is printed on one sheet in Step S16, then the routine terminates.

In Step S6, if N pages of the document are completely read (YES in Step S6), it is judged in Step S7 whether or not the setting for giving a ground pattern is configured.

If the setting for giving a ground pattern is configured (YES in Step S7), ground patterns are generated for the respective N pieces of image data in Step S8.

Subsequently, the ground patterns are given and merged to the respective N pieces of image data in Step S9, and the merged N pieces of image data are printed on one sheet in Step S10.

If the setting for giving a ground pattern is not configured in Step S7 (NO in Step S7), the routine skips Steps to generate and give a ground pattern. Then the N pieces of image data are printed on one sheet in Step S10.

In Step S11, it is judged whether or not there is any following page of the document, and if there is any following page of the document (YES in Step S11), the routine returns to Step S4. If there is no following page of the document (NO in Step S11), the routine terminates.

Meanwhile, if it is judged in Step S5 the N in 1 mode is not enabled (NO in Step S5), then it is judged in Step S17 whether or not the setting for giving a ground pattern is configured. If the setting for giving a ground pattern is configured (YES in Step S17), a ground pattern is generated in Step S18. Then the ground pattern is given and merged to the image data of the document in Step 19, and the merged image data is printed on a sheet in Step 20, and then the routine terminates. In this embodiment, one set of a security code and a password is given to one sheet.

If the setting for giving a ground pattern is not configured (NO in Step S17), the image data read out from the document is directly printed on a sheet in Step S20.

In this way as explained in this embodiment, when images of N pages of a document are printed on a sheet by the N in 1 mode and by the security code giving mode, security codes and passwords are given to respective areas on the sheet, in which N pieces of image data read out from the document are to be printed. In other words, information "copy prohibit" or "copy permit" for example and a password are given to each of the areas on the sheet, i.e., each of the image data read out from the document, which contributes to flexibility of document security management.

Hereinafter, one embodiment will be explained with reference to FIG. 4, wherein a new document 23 is copied on a sheet, and the new document 23 is a sheet having image data read out from N pages of an original document printed by the N in 1 mode, and also having a security code and a password given to each area therein.

When the document 23 is copied on a sheet 32, the ground patterns 41 and 42 are detected from the areas 31a and 31b of the document 23, respectively. If "copy prohibit" information and a password are detected out, then entry of the passwords D1 and D2 is requested via the display 52 of the operation panel 5, about the areas 31a and 31b, respectively.

If the password entered for the area 31b is appropriate (if it is exactly the password D2) and the password entered for the area 31a is inappropriate (if it is not the password D1) or nothing is entered for the area 31a, then a blank space is outputted in an area 32a on the sheet 32, which corresponds to the area 31a, as shown in FIG. 4. In this way, an image protected by the "copy prohibit" security code is not outputted on a sheet, which prevents the image from being leaked to outsiders.

Alternatively, a print job to print the document is canceled if the entered password is inappropriate or nothing is entered.

Alternatively, information to notify a user of a password error is printed on the sheet 32, or the sheet 32 is outputted without a strange blank space to look better, if his/her entered password is inappropriate.

Hereinbelow, some examples of the outputted sheet 32 right above will be explained with reference to in FIG. 7.

Figure 7:
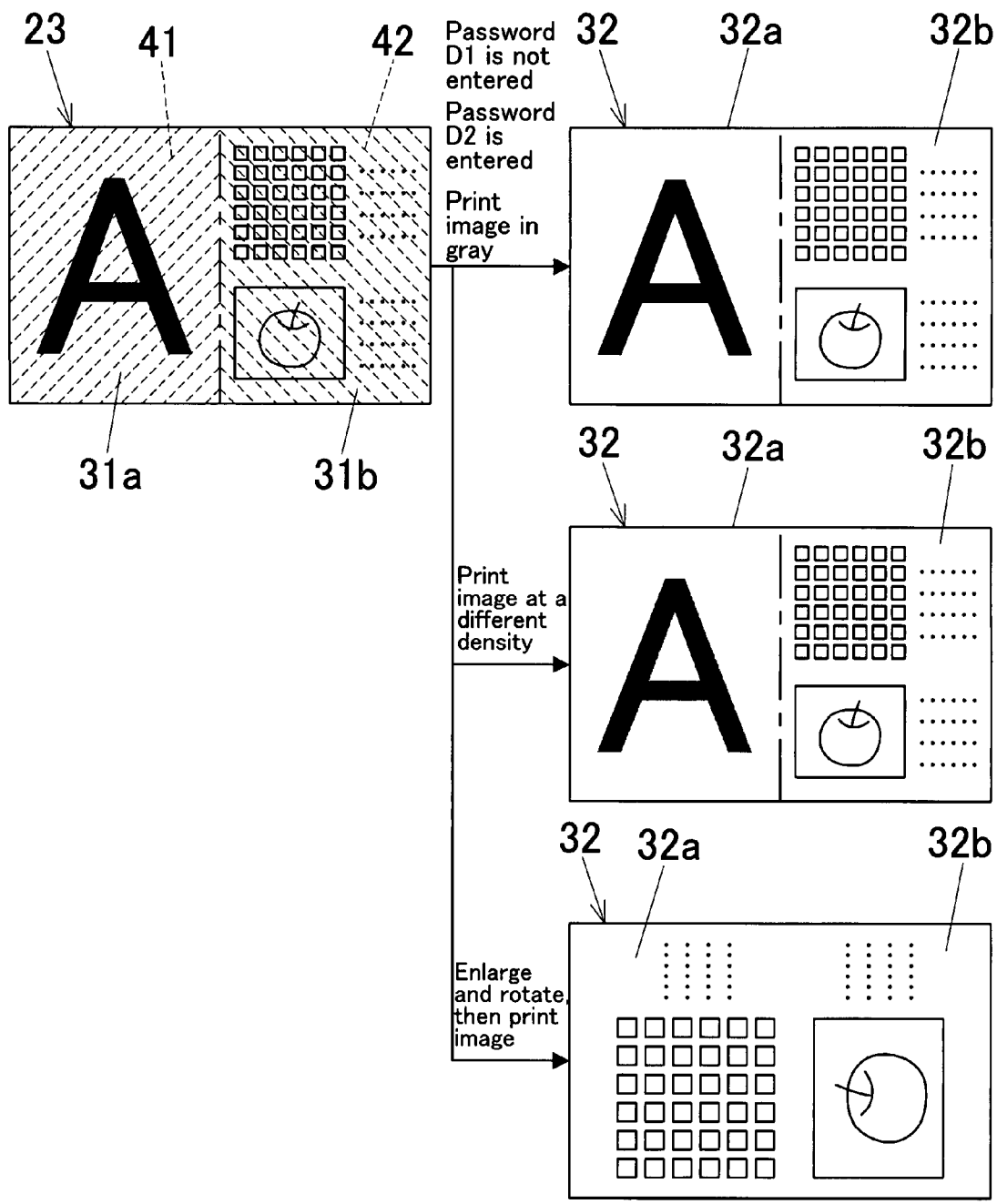
FIG. 7 is a view to explain operations performed if an entered password is inappropriate.

When the document 23 is copied on the sheet 32, an image from the area 31a is printed in a different color on the sheet 32 as shown in the upper right region of FIG. 7, if the password entered for the area 31a is inappropriate (if it is not the password D1) or nothing is entered for the area 31a. In this embodiment, a full-color image is printed in gray on the sheet.

Alternatively, an image from the area 31a is printed at a different density (for example, at a lower density) on the sheet 32 as shown in the vertical middle and right region of FIG. 7.

Alternatively, an image from the area 31a is enlarged or reduced, then printed on the sheet 32, although it is not shown in Figure.

Alternatively, an image from the area 31a is not printed; instead, a permitted image from the area 31b is rotated then printed in the center of the sheet 32, or enlarged then printed so as to fill in the whole sheet 32. As a matter of course, it can be both rotated and enlarged, then printed on the sheet as shown in the lower right region of FIG. 7.

Further, another embodiment will be explained with reference to FIG. 8, wherein the document 23 is copied on a sheet, and the document 23 is a sheet having images P1 through P4 printed by the 4 in 1 mode and also having given passwords D1 through D4 in respective four areas 23a through 23d, and then only the password entered for the area 23b is inappropriate.

Figure 8:
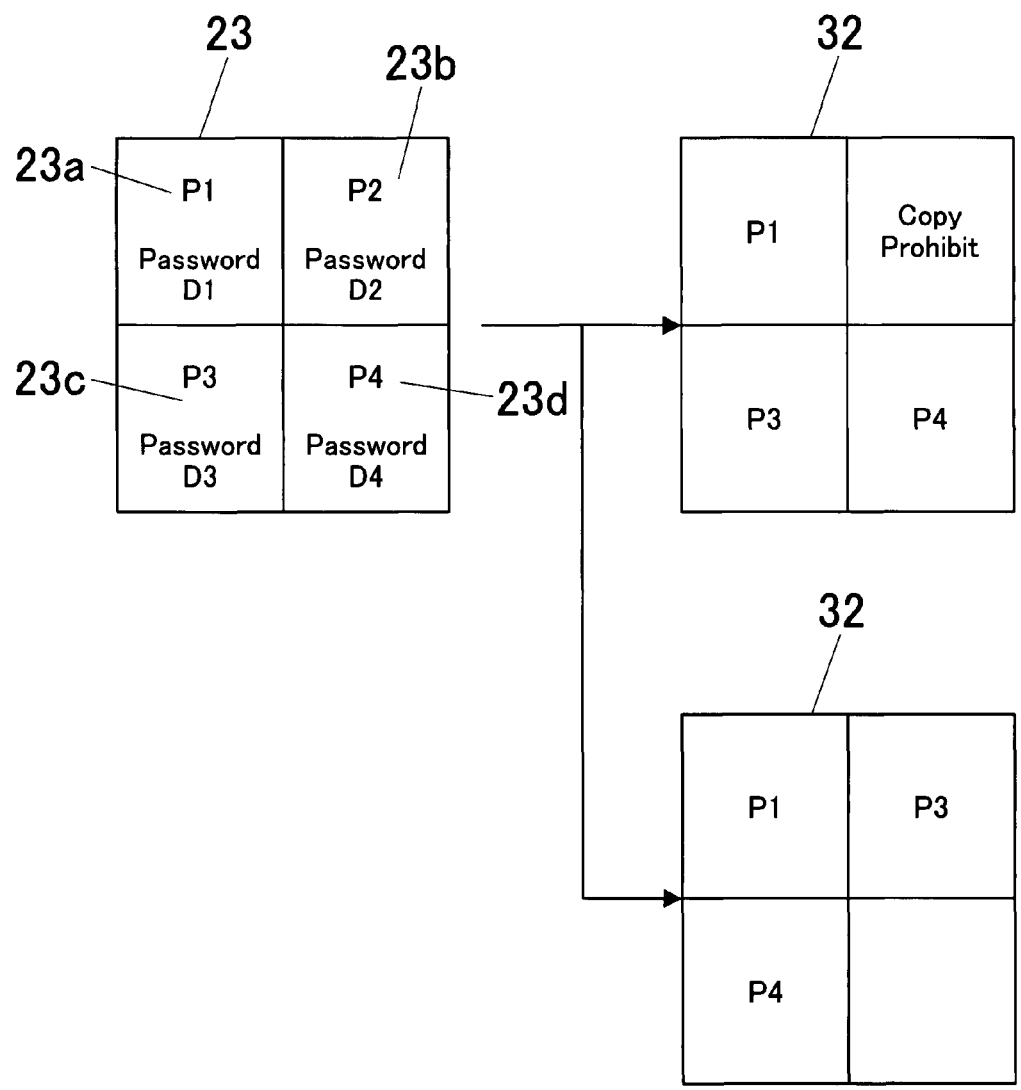
FIG. 8 is a view to explain other operations performed if an entered password is inappropriate.

If the password entered for the area 23b is inappropriate, information for example "copy prohibit" is printed in a particular area on the sheet, which corresponds to the area 23b, so as to notify the image is prohibited to be copied, as shown in the upper right region of FIG. 8. Alternatively, the permitted images P3 and P4 from the areas 23c and 23d are printed in particular areas on the sheet 32, which correspond to the areas 23b and 23c, without a space for the prohibited image.

According to the embodiments explained with reference to FIG. 7 and FIG. 8, a user trying to copy the document 23 on a sheet recognizes his/her entered password is inappropriate, or obtains an outputted sheet that looks better without a strange blank space.

Further, if the entered password is inappropriate, a message can be displayed in the screen 52a on the display 52 of the operation panel 5, for example "The 'copy prohibit' code is detected out. The document will be copied by *** mode." as shown in FIG. 9. In this way, a user trying to copy the document recognizes more easily his/her entered password is inappropriate.

Figure 10:
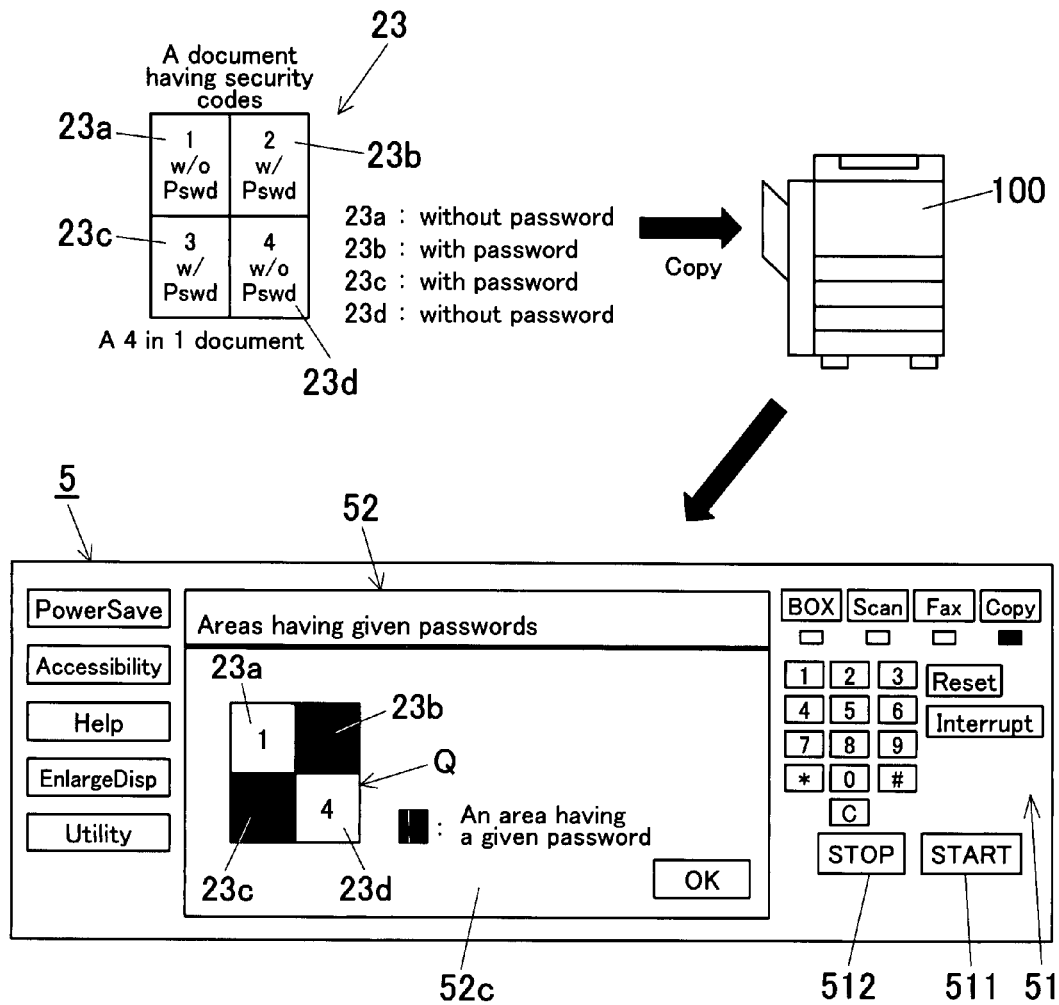
FIG. 10 is a plain view showing the operation panel with a display that displays areas having given passwords.

Further, as shown in FIG. 10, areas having given passwords (the areas 23b and 23c in FIG. 10) can be displayed on the display 52 of the operation panel 5. In this embodiment, the areas having given passwords are marked in black. In this way, a user trying to copy the document recognizes more easily the document contains some images prohibited to be printed.

A procedure to detect a security code and a password will be explained with reference to the flowchart in FIG. 11. The processes are executed also by the CPU 1 according to an operation program recorded in a recording medium such as the ROM 2.

In this embodiment, pages of a document are set separately one by one on a document table to be copied on a sheet.

Figure 11:
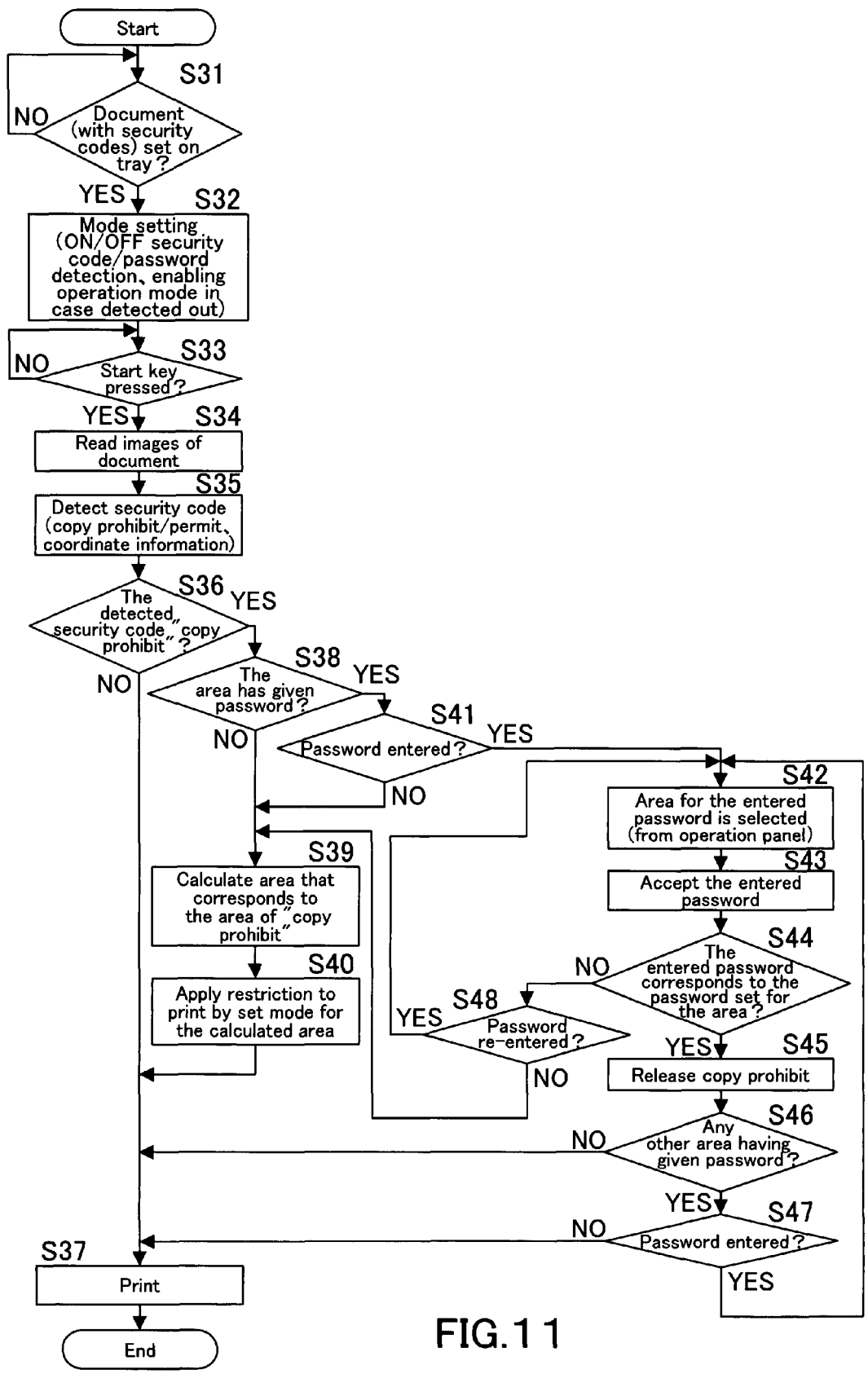
FIG. 11 is a flowchart showing a procedure to detect a security code.

As shown in FIG. 11, the routine waits until a document is set in Step S31, and if a document is set (YES in Step S31), mode settings are performed according to user operation in Step S32. The mode settings are enabling/disabling (ON/OFF) the mode to detect a security code and a password, setting an operation performed if the mode to detect a security code and a password is enabled and the detected security code is "copy prohibit", and setting an operation performed depending on whether or not the entered password is appropriate, etc.

In Step S33, the routine waits until the start key 511 is pressed. If the start key is pressed (YES in Step 33), images of a document are started to be read by the scanner 4 in Step S34.

A security code is detected in Step S35, and it is judged in Step S36 whether or not the detected security code is "copy prohibit". If the detected security code is not "copy prohibit" (NO in Step S36), the images are printed in Step S37, and then the routine terminates.

If the detected security code is "copy prohibit" (YES in Step S36), it is judged in Step S38 whether or not the area from which "copy prohibit" is detected out has a given password. If it does not have a given password (NO in Step S38), an area on the sheet to be outputted, which corresponds to the area of "copy prohibit" is calculated based on the security code information in Step S39. Then in Step S40, a restriction to print by the pre-set mode (print prohibition) is applied for the calculated area on a sheet to be outputted, which corresponds to the area of "copy prohibit". Then, the sheet is printed out under the restriction.

If the area has a given password (YES in Step S38), a user is requested to enter a password in Step S41, and if no password is entered (NO in Step S41), then the routine proceeds to Step S39 in which an area on a sheet to be outputted, which corresponds to the area of "copy prohibit", is calculated. Then, the sheet is printed out under the restriction.

If a password is entered (YES in Step S41), an area for the entered password is selected by user operation from the operation panel 5 in Step S42, and then the entered password is accepted in Step S43. Subsequently in Step S44, it is judged whether or not the entered password is an appropriate one that corresponds to the password pre-set for the area.

If the entered password is not an appropriate one that corresponds to the password pre-set for the area (NO in Step S44), then in Step S48, a message to request for re-entry of password is displayed on the operation panel 5 and it is judged whether or not a password is re-entered by the user. If no password is entered (NO in Step S48), the routine proceeds to Step S39 in which an area on a sheet to be outputted, which corresponds to the area of "copy prohibit" is calculated. Then, the sheet is printed out under the restriction. If a password is re-entered (YES in Step S48), the routine returns to Step S42 to repeat Step S42 through Step S44.

If the entered password is an appropriate one that corresponds to the password pre-set for the area (YES in Step S44), copy prohibit is released in Step S45, and then it is judged in Step S46 whether or not there is any other area having a given password.

If there is any other area having a given password (YES in Step S46), it is judged in Step S47 whether or not a password is entered by the user. If no password is entered (NO in Step S47), the routine proceeds to Step 37 in which the sheet is printed out. If a password is entered (YES in Step S47), the routine returns to Step S42 to repeat Steps until there is no more area having a given password.

If there is no more area having a given password (NO in Step S46), the sheet is outputted in Step S37.

As described above in this embodiment, a password is given to each area in a document, and an operation to print image data read out from each of the areas is decided depending on whether or not a password entered for the area is appropriate. In this way, security is ensured by areas on a sheet, which contributes to usability of document security management.

Figure 12:
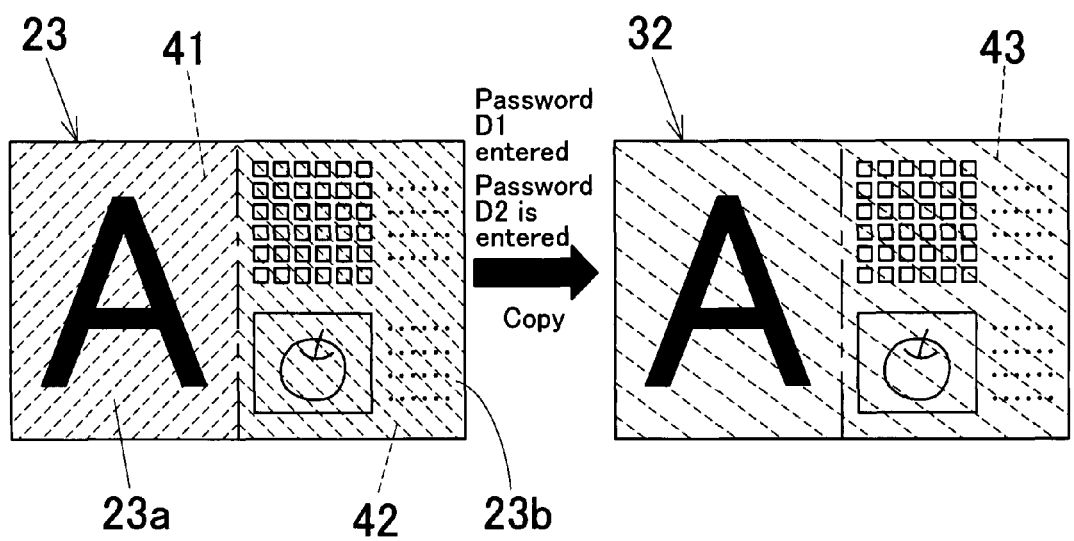
FIG. 12 is a view to explain an operation to give, when a document having a security code and a password given to each plurality of areas therein is copied on a sheet, a new security code and password to the whole sheet.

Hereinafter, one embodiment will be explained with reference to FIG. 12, wherein a new security code and password are given to an outputted sheet when the document 23 having a security code and a password already given to each plurality of areas therein is copied on the sheet.

Specifically, for example, a new ground pattern 43 (a password D3) is given to the whole sheet 32 to be outputted, when the document 23 having the ground pattern 41 (the password D1) and the ground pattern 42 (the password D2) given already to two areas therein is copied on the sheet 32. The number of the new ground pattern is not limited to only one, therefore two new ground patterns can be given to respective areas on the sheet 32, which correspond to the areas 23a and 23b on the document 23.

In this way, a document with a password is prevented from being copied on a sheet without password, which accomplishes higher security.

In this embodiment explained above, a security code and a password are entered from the operation panel 5 before images of a document are read. However, it is not limited to the embodiment.

For example, a user can be repeatedly required to give a security code and a password every time one page of a document transferred by an automatic document feeder or set on a document table is completely read by the scanner 4. Briefly, a security code and a password are entered after each page of a document is read.

Alternatively, a user is required to give security codes and passwords collectively, when all pages of a document transferred by an automatic document feeder or set separately one by one on a document table are completely read by the scanner 4. Briefly, security codes and passwords are entered after all pages of a document are read.

SUMMARY OF THE EMBODIMENTS

In this embodiment, the following image processing apparatuses, image processing methods and recording mediums are disclosed.

[1] An image processing apparatus, comprising: a document reader that reads images printed in a plurality of areas in a document; a printer that prints on a sheet image data read out from the document by said document reader; a security code detector that detects a security code given to each of the plurality of areas in said document; a password detector that detects a password given at least to one of the plurality of areas in said document; an entry requestor that requests a password to be entered; a password judgment part that judges whether or not said entered password is an appropriate one that corresponds to the password detected by the password detector; and a controller that decides an operation performed by said printer, to print image data read out from the area having the given password, depending on the judgment result drew by said password judgment part.

According to this image processing apparatus, a document is a sheet having images printed in a plurality of areas thereon, and also having a security code given to each of the areas and a password given at least one of the areas. An image of the document is read then its security code and password are detected. Then, a password is requested to be entered, and it is judged whether or not the entered password is appropriate. And then, an operation performed by the printer, to print image data read out from the area having a given password, is decided depending on the judgment result. In this way, a password is not given to a whole sheet but is given by areas, which ensures security by areas on a sheet and would contribute to usability of document security management.

[2] An image processing apparatus as recited in the preceding paragraph [1], wherein said controller permits the mage data from the area having the given password to be printed, if it is judged by said password judgment part that the entered password is appropriate.

According to this image processing apparatus, image data read out from the area having a given password is permitted to be printed if it is judged the entered password is appropriate. Thus, for example, a user permitted only to copy the image data is allowed to copy the image data, but not allowed to browse images from other than the area.

[3] An image processing apparatus as recited in the preceding paragraph [1], wherein said document is a sheet having the images printed in the plurality of areas thereon by the N in 1 mode to print images of N pages of an original document on one sheet, and said password detector detects a password originally given to the original document.

According to this image processing apparatus, a document is a sheet having images printed in a plurality of areas thereon by the N in 1 mode to print images of N pages of an original document on one sheet, and the sheet takes over the security level from the original document, which contributes to document security management.

[4] An image processing apparatus as recited in the preceding paragraph [1], wherein said controller makes the printer to output a blank space in a particular area that corresponds to the area having the given password, if it is judged by said password judgment part that the entered password is inappropriate.

According to this image processing apparatus, a blank space is outputted in a particular area on a sheet, which is corresponds to the area having a given password, if it is judged the entered password is inappropriate, which prevents an image protected by a password from being leaked to outsiders.

[5] An image processing apparatus as recited in the preceding paragraph [1], wherein said controller cancels a print job to print the document, if it is judged by said password judgment part that the entered password is inappropriate.

According to this image processing apparatus, a print job to print a document is canceled if it is judged the entered password is inappropriate, which prevents an image protected by a password from being leaked to outsiders.

[6] An image processing apparatus as recited in the preceding paragraph [1], wherein said controller makes the printer print information indicating copy prohibit, if it is judged by said password judgment part that the entered password is inappropriate.

According to this image processing apparatus, information indicating copy prohibit is printed if it is judged the entered password is inappropriate, by which a user recognizes his/her entered password is inappropriate.

[7] An image processing apparatus as recited in the preceding paragraph [1], wherein said controller makes the printer print the image data read out from the area having the given password in a different color, if it is judged by said password judgment part that the entered password is inappropriate.

According to this image processing apparatus, image data read out from the area having a given password is printed in a different color if it is judged the entered password is inappropriate, by which a user recognizes his/her entered password is inappropriate.

[8] An image processing apparatus as recited in the preceding paragraph [1], wherein said controller makes the printer print the image data read out from the area having the given password at a different density, if it is judged by said password judgment part that the entered password is inappropriate.

According to this image processing apparatus, image data read out from the area having a given password is printed at a different density if it is judged the entered password is inappropriate, by which a user recognizes his/her entered password is inappropriate.

[9] An image processing apparatus as recited in the preceding paragraph [1], wherein said controller makes the printer print the image data read out from the area having the given password at a different size, if it is judged by said password judgment part that the entered password is inappropriate.

According to this image processing apparatus, image data read out from the area having a given password is printed at a different size if it is judged the entered password is inappropriate, by which a user recognizes his/her entered password is inappropriate.

[10] An image processing apparatus as recited in the preceding paragraph [1], wherein said controller makes the printer print image data from other than the area having the given password with their positions moved forward, instead of image data from the area having the given password, if it is judged by said password judgment part that the entered password is inappropriate.

According to this image processing apparatus, a blank space is not outputted on the sheet; instead, image data read out from other than the area having a given password is printed if it is judged the entered password is inappropriate, by which an sheet that looks better without a blank space is outputted.

[11] An image processing apparatus as recited in the preceding paragraph [1], wherein said controller makes the printer rotate and/or enlarge, then print image data from other than the area having the given password so as to fill in a blank space caused by image data from the area having the given password, if it is judged by said password judgment part that the entered password is inappropriate.

According to this image processing apparatus, image data read out from other than the area having a given password is rotated or enlarged, then printed so as to fill in a blank space on the sheet, if it is judged the entered password is inappropriate, by which an sheet that looks better without a blank space is outputted.

[12] An image processing apparatus as recited in the preceding paragraph [1], wherein said controller makes said display a message indicating copy prohibit, if it is judged by said password judgment part that the entered password is inappropriate.

According to this image processing apparatus, a message indicating copy prohibit is displayed on a display, by which a user recognizes his/her entered password is inappropriate.

[13] An image processing apparatus as recited in the preceding paragraph [1], further comprising a display that displays the area having the given password.

According to this image processing apparatus, the area having a given password is displayed on a display, by which a user recognizes the area easily.

[14] An image processing apparatus as recited in the preceding paragraph [1], wherein the security code and the password are printed on the sheet simultaneously with the image data, as a ground pattern.

According to this image processing apparatus, a security code and a password are printed on a sheet as a ground pattern simultaneously with image data, thus the security code and the password can be treated as image data.

[15] An image processing apparatus as recited in the preceding paragraph [1], further comprising a password giver that gives a new password to the sheet to be outputted by the printer.

According to this image processing apparatus, a new password is given to a sheet when the sheet is outputted by the printer, which ensures higher security.

[16] An image processing apparatus, comprising: a document reader that reads images of a document; a printer that prints on a sheet image data read out from the document by said document reader; a mode setter that enables the N in 1 mode to print images of N pages of a document on one sheet; a security code giver that gives a security code by the security code giving mode to each of a plurality of areas on said sheet, in which the image data read out from the document is to be printed, if the N in 1 mode is enabled by said mode setter; a display that displays the plurality of areas to be outputted on the sheet, if the N in 1 mode is enabled; an area selector that selects at least one of the plurality of areas displayed on said display; and a password giver that gives a password to said selected area.

According to this image processing apparatus, a plurality of areas to be outputted on a sheet by the N in 1 mode are displayed on the display, then at least one of the displayed areas is selected, and then a password is given to the selected area, by which a document having different passwords given to respective areas therein can be obtained easily.

[17] An image processing method, comprising: reading images printed in a plurality of areas in a document; printing on a sheet image data read out from said document; detecting a security code given to each of the plurality of areas in said document; detecting a password given at least to one of the plurality of areas in said document; requesting a password to be entered; judging whether or not said entered password is an appropriate one that corresponds to said detected password; and deciding an operation to print image data read out from the area having the given password, depending on said judgment result.

According to this image processing apparatus, not one password is given to a whole document but different passwords are given to respective areas on a sheet, which contributes to usability of document security management by areas.

[18] An image processing method, comprising: reading images of a document; enabling the N in 1 mode to print images of N pages of a document on one sheet; giving a security code by the security code giving mode to each of a plurality of areas on a sheet, in which image data read out from the document is to be printed, if said N in 1 mode is enabled; displaying the plurality of areas to be outputted on the sheet, if the N in 1 mode is enabled; selecting at least one of said displayed plurality of areas; and giving a password to said selected area.

According to this processing apparatus, a plurality of areas to be outputted on a sheet by the N in 1 mode are displayed, then at least one of the displayed areas is selected, and then a password is given to the selected area, by which a document having different passwords given by areas therein can be obtained easily.

[19] A recording medium having therein a recorded image processing program to make a computer in an image processing apparatus execute: reading images printed in a plurality of areas in a document; printing on a sheet image data read out from said document; detecting a security code given to each of the plurality of areas in said document; detecting a password given at least to one of the plurality of areas in said document; requesting a password to be entered; judging whether or not said entered password is an appropriate one that corresponds to said detected password; and deciding an operation to print image data read out from the area having the given password, depending on said judgment result.

According to this image processing apparatus, a computer therein executes the respective steps described in the preceding paragraph [17].

[20] A recording medium having therein a recorded image processing program to make a computer in an image processing apparatus execute: reading images of a document; enabling the N in 1 mode to print images of N pages of a document on one sheet; giving a security code by the security code giving mode to each of a plurality of areas on a sheet, in which image data read out from the document is to be printed, if said N in 1 mode is enabled; displaying the plurality of areas to be outputted on the sheet, if the N in 1 mode is enabled; selecting at least one of said displayed plurality of areas; and giving a password to said selected area.

According to this image processing apparatus, a computer therein executes the respective steps described in the preceding paragraph [18].

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus, comprises:
   a document reader that reads a document in which a plurality of images are printed in a plurality of areas;
   a printer that prints, on a sheet, images read out from the document by said document reader;
   a security code detector that, for each of the plurality of areas in said document, detects a security code, printed in each respective area of the plurality of areas in said document, which indicates permission or indicates a limitation of printing of images within each respective area of the plurality of areas;
   a password detector that detects a password, printed in at least one area of the plurality of areas in said document, to cancel said limitation given by said security code to the corresponding area;
   an entry requestor that requests a password to be entered;
   a password judgment part that judges whether or not said entered password is an appropriate one that corresponds to the password detected by the password detector; and
   a controller that decides an operation performed by said printer, to print images of the areas having the given password, depending on the judgment result drew by said password judgment part.

2. An image processing apparatus as recited in claim 1, wherein said controller permits the image data from the area having the given password to be printed, if it is judged by said password judgment part that the entered password is appropriate.

3. An image processing apparatus as recited in claim 1, wherein said document is a sheet having the images printed in the plurality of areas thereon by the N in 1 mode to print images of N pages of an original document on one sheet, and
   said password detector detects a password originally given to the original document.

4. An image processing apparatus as recited in claim 1, wherein said controller makes the printer to output a blank space in a particular area that corresponds to the area having the given password, if it is judged by said password judgment part that the entered password is inappropriate.

5. An image processing apparatus as recited in claim 1, wherein said controller cancels a print job to print the document, if it is judged by said password judgment part that the entered password is inappropriate.

6. An image processing apparatus as recited in claim 1, wherein said controller makes the printer print information indicating copy prohibit, if it is judged by said password judgment part that the entered password is inappropriate.

7. An image processing apparatus as recited in claim 1, wherein said controller makes the printer print the image data from the area having the given password in a different color, if it is judged by said password judgment part that the entered password is inappropriate.

8. An image processing apparatus as recited in claim 1, wherein said controller makes the printer print the image data from the area having the given password at a different density, if it is judged by said password judgment part that the entered password is inappropriate.

9. An image processing apparatus as recited in claim 1, wherein said controller makes the printer print the image data from the area having the given password at a different size, if it is judged by said password judgment part that the entered password is inappropriate.

10. An image processing apparatus as recited in claim 1, wherein said controller makes the printer print image data from other than the area having the given password with their positions moved forward, instead of image data from the area having the given password, if it is judged by said password judgment part that the entered password is inappropriate.

11. An image processing apparatus as recited in claim 1, wherein said controller makes the printer rotate and/or enlarge, then print image data from other than the area having the given password so as to fill in a blank space caused by image data from the area having the given password, if it is judged by said password judgment part that the entered password is inappropriate.

12. An image processing apparatus as recited in claim 1, wherein said controller makes said display a message indicating copy prohibit, if it is judged by said password judgment part that the entered password is inappropriate.

13. An image processing apparatus as recited in claim 1, further comprising a display that displays the area having the given password.

14. An image processing apparatus as recited in claim 1, wherein the security code and the password are printed on the sheet simultaneously with the image data, as a ground pattern.

15. An image processing apparatus as recited in claim 1, further comprising a password giver that gives a new password to the sheet to be outputted by the printer.

16. An image processing apparatus, comprising:
a document reader that reads images of a document;
a printer that prints on a sheet image data read out from the document by said document reader;
a mode setter that enables an N in 1 mode to print images of N pages of a document in respective areas from a plurality of areas on one sheet;
a security code giver that gives, if the N in 1 mode is enabled by said mode setter, a respective security code to be printed in each of the plurality of areas in which the image data is to be printed, said each respective security code indicating limitation or permission of printing of images to each of the plurality of areas on said sheet;
a display that displays the plurality of areas to be printed on one sheet, if the N in 1 mode is enabled;
an area selector that selects at least one of the plurality of areas displayed on said display; and
a password giver that gives a password, to be printed in said at least one selected area, to cancel said limitation given by said security code to said selected area.

17. An image processing method, comprising:
reading a document in which a plurality of images are printed in a plurality of areas;
printing on a sheet images read out from said document;
detecting a security code, printed in each of the plurality of areas in said document, indicating limitation or permission of printing of images corresponding to the plurality of areas;
detecting a password printed in at least one of the plurality of areas in said document to cancel said limitation given by said security code to the corresponding area;
requesting a password to be entered;
judging whether or not said entered password is an appropriate one that corresponds to said detected password; and
deciding an operation performed by said printer, to print images of the areas having the given password, depending on said judgment result.

18. An image processing method, comprising:
reading images of a document;
enabling an N in 1 mode to print images of N pages of a document in respective areas from a plurality of areas on one sheet;
giving, if the N in 1 mode is enabled, a respective security code to be printed in each of the plurality of areas in which the image data is to be printed, said each respective security code indicating limitation or permission of printing of images to each of the areas on said sheet;
displaying the plurality of areas to be printed on one sheet, if the N in 1 mode is enabled;
selecting at least one of said displayed plurality of areas; and
giving a password, to be printed in said at least one selected area, to cancel said limitation given by said security code to said selected area.

19. A non-transitory recording medium having an image processing program recorded therein to make a computer in an image processing apparatus execute;
reading a document in which a plurality of images are printed in a plurality of areas;
printing on a sheet images read out from said document;
detecting a security code, printed in each of the plurality of areas in said document, to give limitation or permission of printing of images corresponding to the plurality of areas;
detecting a password printed in at least one of the plurality of areas in said document to cancel said limitation given by said security code to the corresponding area;
requesting a password to be entered;
judging whether or not said entered password is an appropriate one that corresponds to said detected password; and
deciding an operation to print images of the areas having the given password, depending on said judgment result.

20. A non-transitory recording medium having an image processing program recorded therein to make a computer in an image processing apparatus execute:
reading images of a document;
enabling an N in 1 mode to print images of N pages of a document in respective areas from a plurality of areas on one sheet;
giving, if the N in 1 mode is enabled, a respective security code to be printed in each of the plurality of areas in which the image data is to be printed, said each respective security code indicating limitation or permission of printing of images to each of the areas on said sheet;
displaying the plurality of areas to be printed on one sheet, if the N in 1 mode is enabled;
selecting at least one of said displayed plurality of areas; and
giving a password, to be printed in said at least one selected area, to cancel said limitation given by said security code to said selected area.

* * * * *